United States Patent [19]

Eustache

[11] Patent Number: 4,790,046
[45] Date of Patent: Dec. 13, 1988

[54] WINDSHIELD WIPER DEVICE WITH A NON-CIRCULAR SWEEPING MOTION

[75] Inventor: Jean-Pierre E. Eustache, Antony, France

[73] Assignee: Equipements Automobiles Marchal, Issy-Les-Moulineaux, France

[21] Appl. No.: 816,057

[22] Filed: Jan. 3, 1986

[30] Foreign Application Priority Data

Jan. 4, 1985 [FR] France .................................. 85 00069

[51] Int. Cl.⁴ .................................................. B60S 1/24
[52] U.S. Cl. ............................ 15/250.21; 15/250.23
[58] Field of Search ............ 15/250.21, 250.23, 250.35, 15/250.13, 250.27

[56] References Cited

U.S. PATENT DOCUMENTS

| | | | | |
|---|---|---|---|---|
| 2,644,187 | 7/1953 | Lacy | ................... | 15/250.35 |
| 3,422,480 | 1/1969 | Kato . | | |
| 4,512,056 | 4/1985 | Wattier | ................... | 15/250.23 |

FOREIGN PATENT DOCUMENTS

2541641 8/1984 France .
854780 8/1981 U.S.S.R. ........................... 15/250.23

Primary Examiner—Peter Feldman
Attorney, Agent, or Firm—Brisebois & Kruger

[57] ABSTRACT

A windshield wiper device with a non-circular sweeping motion, comprises an arm carrying a blade which is caused to oscillate alternately about an axis of rotation by a drive mechanism, combined with a movement of translation such that the windshield wiper blade describes a first path during an outward stage and a second path which differs from the first during a return stage. The drive mechanism is designed to cause the longitudinal ends of the windshield wiper blade and the windshield wiper blade itself to describe paths having the shape of a curved and flattened figure 8 whose concave area faces the axis of rotation with the point of intersection of the lobes of the flattened 8 being disposed substantially in the axis of the vehicle, whereas the ends of the lobes are tangential to the angular end positions of the blade.

10 Claims, 6 Drawing Sheets

WINDSHIELD WIPER DEVICE WITH A NON-CIRCULAR SWEEPING MOTION

FIELD OF THE INVENTION

This invention relates to windshield wiper devices, in particular integral or single blades, for vehicles.

REVIEW OF THE PRIOR ART

It is known to provide a windshield wiper device, particularly an integral or single blade, with a non-circular sweeping motion, which device comprises at least one arm carrying a blade which is caused to have a composite motion comprising an alternating oscillation about an axis of rotation under the influence of a drive mechanism, combined with a movement of translation such that the windshield wiper blade describes a first path during an outward stage of the oscillation and a second path, which differs from the first path, during a return stage thereof.

Windshield wiper devices of this type enable the cleaning of a wider surface area than the area which would be cleaned by a blade of the same size which describes the same path during both the outward and return stages.

However, the known devices of this type have not been totally satisfactory from a practical point of view, which has hindered the wide commercial acceptance of such devices.

OBJECT OF THE INVENTION

It is an object of the invention to provide a windshield wiper device operable in different paths in the outward and return stages, in particular an integral or single blade, which meets the various practical requirements more satisfactorily than known devices, and which provides a substantial and effective increase in the surface area which is cleaned.

SUMMARY OF THE INVENTION

In accordance with the invention, there is provided a windshield wiper device, in particular an integral or single blade, of the type described above, in which the drive mechanism is designed to cause the longitudinal ends of the windshield wiper blade and the windshield wiper blade itself to describe paths having the shape of a curved and flattened figure 8 whose concave area faces the axis of rotation with the point of intersection of the lobes of the figure 8 being disposed substantially in the axis of the vehicle, whereas the ends of the lobes are tangential to the angular end positions of the windshield wiper blades.

With a device of this type, the increase in the surface area cleaned is substantially disposed between the axis of the vehicle and the two angular end positions.

Advantageously, the windshield wiper device comprises a main windshield wiper arm which carries, at its end remote from the axis of rotation, a rocker arm articulated on the main arm about a transverse axis which is substantially parallel to the surface to be cleaned, this rocker arm carrying the windshield wiper blade which is itself articulated about a second auxiliary arm, one end of which is articulated on the rocker arm, generally between the two above-mentioned transverse axes, this auxiliary arm enabling control of the rocker arm movements which cause a displacement of the windshield wiper blade in a direction which is substantially parallel to its longitudinal direction. In this case, the movements of the main arm and the auxiliary arm are angularly offset such that, in the two angular end positions of the main arm, and in the median position of this arm, the two articulations of the auxiliary arm and the main arm occupy a relative median position in the longitudinal direction of the main arm, whereas these two articulations move, during the outward stage, through a relative end position for a position of the main arm disposed between the angular end staring position of the main arm and its substantially median position and, during the return stage, the articulations pass through the relative end position for a position of the main arm disposed between the other angular end position of the main arm and its substantially median position.

The auxiliary arm may be articulated on a pivot which is radially offset with respect to the axis of rotation of the main arm, this pivot itself being caused to rotate alternately about the axis of rotation of the main arm, the alternating rotary movement of the pivot being angularly phase shifted with respect to the alternating rotary movement of the main arm.

The two alternating rotary movements of the main arm and the articulation pivot of the auxiliary arm preferably have the same amplitude and are angularly offset by an angle which is substantially equivalent to half of the angular amplitude of the alternating movements, the two movements also starting in the opposite direction from an angular end position of the main arm.

The drive mechanism advantageously comprises two devices of the cross-shaped four-bar linkage type enabling an angular increase in the surface cleaned with respect to a known connecting rod and crank system.

One of the devices is designed to impart the alternating rotary movement to the main arm, whilst the other device is designed to impart the alternating rotary movement to the articulation pivot of the auxiliary arm. The four-bar linkage of each device comprises two connecting rods which intersect in an articulated manner at one of their ends on a pin and at their other ends on a component forming a lever and rotating about a fixed geometrical axis. One of the components is rotationally rigid with the axis of rotation of the component. The articulation pivot of the auxiliary arm is rigid with the further component forming a lever, but is offset radially with respect to the geometrical axis of rotation of this component. The pin of one of the devices of the cross-shaped four-bar linkage type is articulated at its end remote from this linkage on the end of a crank caused to rotate, at its other end, by a drive shaft. The pin of the other four-bar linkage device is articulated on a spindle caused to follow a circular path about the same axis of rotation as the crank but offset angularly with respect of this crank.

The axis of articulation of the second pin preferably describes a circular path having the same radius as the axis of articulation of the first rod. The axis of articulation of the second rod may be provided on an arm which is rigid with the crank.

The angular displacement on the circular path, between the axis of articulation of the first pin and that of the second pin is advantageously approximately 90°.

Leaving aside the arrangements discussed above, the invention consists in a certain number of ther arrangements which will be discussed in detail below with reference to a particular embodiment, which is in no way limiting, and which described with reference to the accompanying drawings.

PARTICULAR DESCRIPTION OF AN EMBODIMENT

Figure 1:
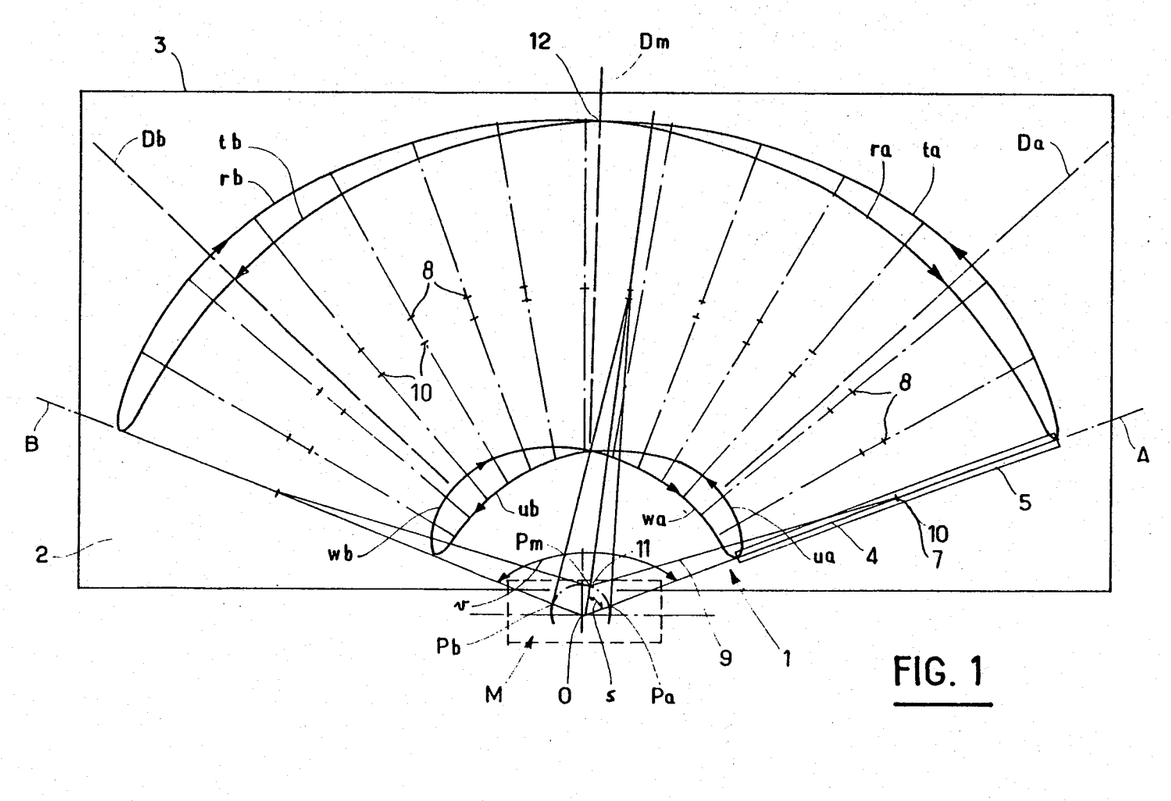
FIG. 1 is a diagram showing the sweeping action obtained with a device of the invention.

Referring now to the drawings, particularly FIG. 1, there can be seen a windshield wiper device 1 of the integral or single blade type designed to clean a sheet of glass 2, for example a windshield, whose outline 13 is shown diagrammatically.

Figure 2:
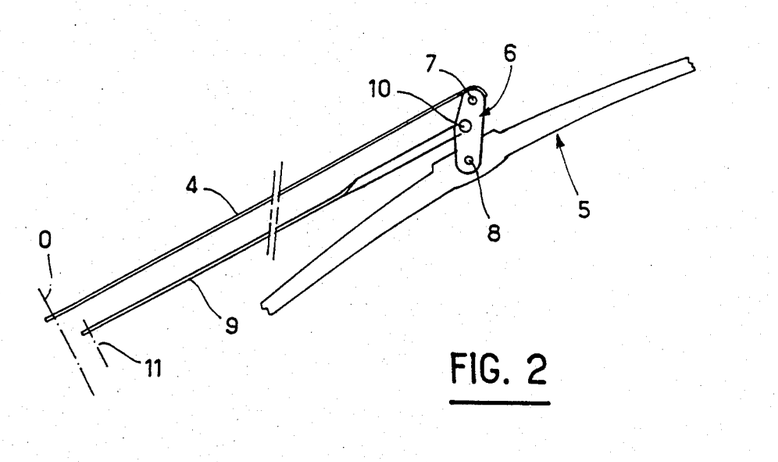
FIG. 2 is a side view of particular embodiment of the invention comprising a main arm and an auxiliary arm.

The windshield wiper device comprises a main windshield wiper arm 4 comprising a blade 5 (see FIG. 2 in particular). This arm 4 may be caused, by a drive mechanism M, to rotate alternately between two angular positions shown at A and B in FIG. 1 about an axis of rotation 0.

As shown in FIG. 2, a rocker arm 6 is provided for the connection between the end of the arm 4 remote from the axis 0 and the blade 5. The rocker arm supported by the end of the arm 4 is articulated on this arm about a transverse spindle 7 substantially parallel to the surface to be cleaned and the surface which has been cleaned 2. This spindle 7 is generally substantially perpendicular to the median longitudinal direction of the arm 4. The windshield wiper blade 5 is articulated about a second transverse spindle 8 supported by the rocker arm 6 and substantially parallel to the spindle 7. In general, the spindle 8 is located closer to the swept surface than the spindle 7.

The windshield wiper device further comprises an auxiliary arm 9, one end of which is connected to the rocker arm 6 by an articulation 10 located between the spindles 7 and 8.

The articulation 10 is preferably of the spherical articulation type. It can be seen that the rocker arm 6 may be rotated in a plane passing through the longitudinal axis of the arm 4 and substantially perpendicular to the surface 2. This movement of the rocker arm 6 causes the windshield wiper blade 5 to move in translation against the surface 2 in a direction substantially parallel to the median longitudinal direction of the arm 4. The rocking movements of the rocker arm 6 about the spindle 7 are controlled by the auxiliary arm 9.

This auxiliary arm 9 is articulated on a pivot 11 (FIGS. 1 and 2) offset radially with respect to the axis of rotation 0 of the main arm. The arm 9 is mounted to rotate freely on this pivot 11 which is parallel to the axis 0.

The pivot 11 is caused, by the drive mechanism M, to rotate alternately about the axis of rotation 0 of the main arm. The two positions $P_a$, $P_b$ of the pivot 11 are shown diagrammatically in FIG. 1.

Figure 3:
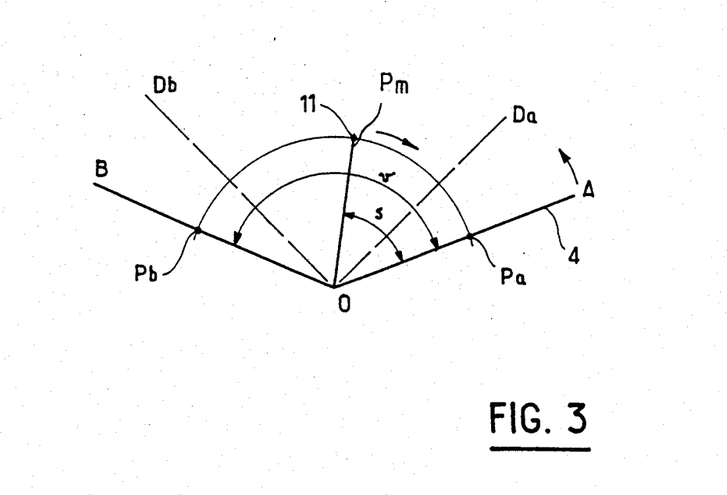
FIG. 3 is a diagram showing the displacement of the alternating rotary movements of the main arm and an articulation pivot of the auxiliary arm.

The two alternating rotary movements of the main arm 4 (between the positions A and B) and the pivot 11 preferably have the same amplitude and are angularly offset by an angle s (FIGS. 1 and 3) substantially equivalent to half of the angular amplitude v of the alternating movements. In addition, starting from an angular end position of the main arm 4, for example the end position A in FIG. 1, the two movements of the arm 4 and the pivot 11 begin in the opposite direction. In the example in question, from the position A shown in FIG. 1, the arm 4 begins by rotating about the axis 0 in the anti-clockwise direction, whilst the pivot 11 begins to move about the axis 0 in the clockwise direction. FIG. 3 summarises these explanations and clearly shows that the pivot 11 begins to move in the opposite direction to the arm 4.

The operation of the windshield wiper device is as follows:

The movement is considered to begin when the arm 4 is in position A. The auxiliary arm 9, as shown in FIG. 1, extends between the pivot 11, offset by the angle s with respect to the arm 4, and the articulation 10. This arrangement of the arms 4 and 9 corresponds to a median relative position of the two articulations 7 and 10 (FIG. 2) in the longitudinal direction of the main arm 4.

The outward stage of the movement corresponds to the passage of the arm 4 from position A to position B. The arm 4 rotates in an anti-clockwise direction during this stage. In contrast, the pivot 11, during the first part of the outward stage, rotates in a clockwise direction and passes from the starting or median position $P_m$ to the first end position $P_a$, and then the direction of the rotary movement of the pivot 11 is reversed and it moves in an anti-clockwise driection to the position $P_m$ which is reached when the main arm 4 is located in position B.

The two arms 4 and 9 pass one above the other when their angular displacement, projected onto the surface cleaned, is zero, which is the case for the angular positions $D_a$, $D_b$ respectively located between the angular end position A and the median angular position $D_m$ of the arm 4 and between the $D_m$ and the other angular end position B.

The positions or directions $D_a$, $D_b$ advantageously pass in the vicinity of the upper corners of the surface 2 shown in FIG. 1.

During the outward stage, when the arm 4 passes from position A to position $D_a$, by the moving in an anti-clockwise direction, the articulation 10 is pushed radially outwardly by the arm 9 such that the blade 5, in addition to its circular movement of translation about the axis 0, is subject to translation in a direction substantially parallel to the longitudinal direction of the arm 4. The blade 5 is maximally remote from the axis 0 during passage through the position $D_a$. The two articulations 7 and 10 occupy a first relative end position in the longitudinal direction of the arm 4 when the latter passes through the position $D_a$. In this relative end position, the articulation 10 is maximally remote from the axis 0.

When the arm 4 passes through the median position $D_m$, the pivot 11 is located at $P_a$ and the two articulations 7 and 10 occupy substantially the same relative median position as for the starting position A.

During the second part of the outward stage, the arm 4 is displaced from $D_m$ to B in the anti-clockwise direction, whilst the pivot 11 is displaced from $P_a$ to $P_m$ also in an anti-clockwise direction. In practice, the relative position of the articulations 10 and 7, in the longitudinal direction of the arm 4, is not substantially modified during this part of the outward stage. It can therefore be considered that the relative position between the articulations 7 and 10, and between $D_m$ and B is substantially the same as for the median position. It would, however, be possible to envisage a drive mechanism M in which, for a second relative end position, the articulation 10 would be located considerably closer to the axis 0 substantially at right angles to $D_b$ during the outward stage and to $D_a$ during the return stage.

During this outward stage, the end of the blade 5 radially most remote from the axis 0 describes the arc of a curve ta between A and $D_m$ and then an arc of a curve tb between $D_m$ and B.

The end of the blade 5 closest to the axis 0 describes an arc ua between A and $D_m$ and ub between $D_m$ and B.

During the return stage, the arm 4 moves from the position B by rotating in a clockwise direction whilst the pivot 11 moves from the position $P_m$ to the position $P_b$ by rotating in an anti-clockwise direction. The two arms 4 and 9 intersect at right angles to the angular position $D_b$. The articulations 7 and 10 of the main arm and the auxiliary arm are then in their relative end positions, in the longitudinal direction of the arm 4, already discussed for position $D_a$. The blade 5 then has a maximum radial spacing from the axis 0. Consequently, during the return stage, the blade 5 describes a path between the curves rb and wb corresponding to the two radial ends of the blade 5 and differing from the curves tb and ub.

The curve rb is located radially outside of the curve tb. The same applies to the curve wb with respect to the curve ub.

The outward and return paths of the radial ends of the blade 5 intersect, respectively, at the points 12 and 13 located at the position $D_m$.

The arm 4 continues its return stroke beyond the position $D_m$ in a clockwise direction and the pivot 11 moves from $P_b$ to $P_m$, also rotating in a clockwise direction.

The articulations 7 and 10 remain substantially in their relative median position. The end of the blade 5 radially furthest from the axis 0 describes the arc ra, whilst the end of the blade 5 closest to the axis 0 describes the arc wa. These two arcs are disposed radially inwardly with respect to the arcs ta and ua.

Consequently, as can be seen from FIG. 1, the paths of the longitudinal ends of the blade 5 and the paths of each of the points of this blade have the shape of a flattened and curved figure 8, whose concave area faces the axis of rotation 0, the point of intersection 12 or 13 of the lobes of the flattened 8 being located substantially in the axis of the vehicle, i.e. substantially equidistant from the transverse edges of the screen 2. The ends of the lobes are tangential to the angular end positions A, B of the windshield wiper blade.

This path is particularly advantageous as it enables a substantial increase in the sweeping surface towards the positions $D_a$ and $D_b$ which correspond substantially to the directions of the corners of the surface 2 to be cleaned, in which directions the area of the uncleaned zones is largest.

It is evident that the drive mechanism M designed to cause the blade 5 to describe this path could be different from the main arm 4 and auxiliary arm 9 mechanism mounted on a pivot 11 as described above.

In particular, the drive mechanism could comprise a cam combined with a windshield wiper arm 4 movable in translation in its longitudinal direction such that the combined action of the cam and the alternating rotary movement of the arm 4 provides the required path.

In the embodiment in question, using the arm 4, the rocker arm 6 and the auxiliary arm 9, the control of the alternating rotary movements of the main arm 4 and the pivot 11, offset angularly as explained above, may be obtained in different ways.

A particular drive mechanism enabling the two alternating rotary movements discussed above to be achieved in an efficient and economic manner is now described with reference to FIGS. 4 to 11b.

This drive mechanism M comprises two devices Q1 and Q2 of the cross-shaped four-bar linkage type. The device Q1 is designed to impart the alternating rotary movement to the main arm 4, whilst the other device Q2 is designed to impart the alternating rotary movement to the articulation pivot 11 of the auxiliary arm 9.

Figure 4:
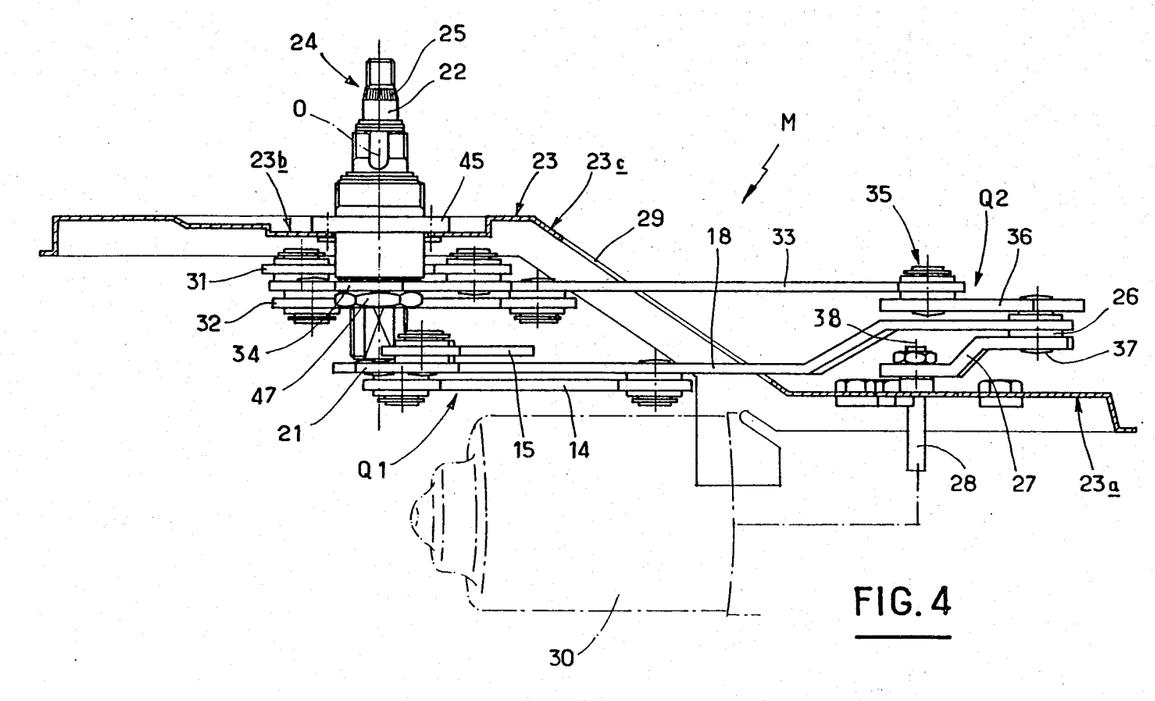
FIG. 4 is an elevation of a device of the invention comprising a main arm and an auxiliary arm, in which the drive mechanism comprises two cross-shaped four-bar linkage devices.
Figures 5, 6:
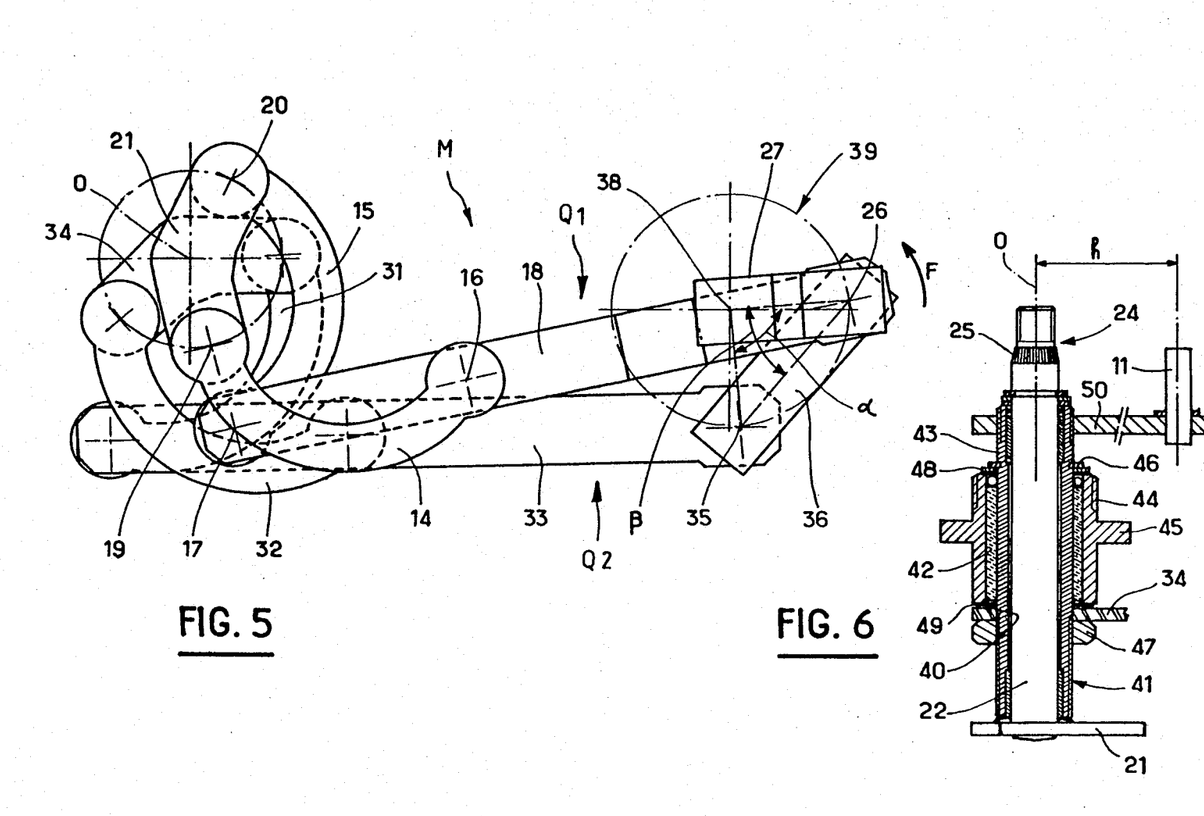
FIG. 5 is a view from below, with respect to FIG. 4, of the drive mechanism.
FIG. 6 is a view on an enlarged scale of the output shaft of the drive mechanism.

The four-bar linkage of the device Q1 comprises two connecting rods 14, 15, in particular in the shape of semi-circular arcs whose concave areas face one another. The connecting rods 14, 15 intersect and are articulated at one of their ends on a pin 18 at 16 and 17 respectively. At their other ends 19 and 20 respectively, the connecting rods 14, 15 are articulated on a component having a obtuse angle shape as shown in FIG. 5 and forming a lever. This component 21 is mounted to rotate about the fixed geometrical axis 0 located substantially at the intersection of the median lines of the two arms of the components 21. As shown in FIGS. 4 and 6, the component 21 is rotationally rigid with an output shaft 22 having the axis 0 as its geometrical axis, and perpendicular to the median plane of the component 21.

The rotational connection between this component 21 and the shaft 22 may be provided by an appropriate means, for example by the engagement of a rectangular window provided substantially in the centre of the component 21 with the end of the shaft 22 arranged so as to have a transverse section which fits into this window.

The shaft 22 passes through the wall of a plate 23 for the whole of the device and its end 24, provided with a grooved frusto-conical surface 25 with which the base of the main arm 4 driven by the shaft 22 engages, projects from the side of this plate 23 opposite to the device Q1. In a conventional manner, the end 24 above surface 25 comprises an external thread designed to receive a locking screw for the base of the arm 4.

The pin 18, at its end remote from the connecting rods 13, 15 is connected, by an articulation 26, to the end of the crank 27 which is caused to rotate at its other end by a drive shaft 28. The crank 27 is locked against rotation on this shaft 28 parallel to the axis 0.

The plate 23 is extended, from the side of the crank 27, by a portion 23a offset parallel to the axis 0 with respect to the portion 23b through which the shaft 22 passes. The transition zone 23c providing the connection between the portions 23a and 23b comprises an aperture 29 through which the pin 18 passes. The crank 27 is located, with respect to the portion 23a, on the same side as the end 24 with respect to the portion 23b. The drive shaft 28 passes through the portion 23a and is driven in particular via a gear train by an electric motor 30 shown in outline and designed to be fixed to the plate 23.

As shown in FIG. 4, the end of the pin 18 remote from the connecting rods 14, 15 is bent in the same way as the crank 27 such that the articulation 26 is sufficiently spaced from the portion 23a to prevent it from contacting the motor fastenings.

When the shaft 28 is caused to rotate continuously, the device Q1 converts this movement and imparts an alternating rotary movement to the shaft 22 as will be described in detail below.

The other four-bar linkage device Q2 also comprises two connecting rods 31, 32 which intersect and which are preferably identical to the connecting rods 14, 15. The connecting rods 31, 32 are articulated in the same conditions as the rods 14, 15 at one of their ends on a pin 33 and, at their other ends, on a component 24 similar to the component 21, forming a lever and mounting to rotate about the fixed geometrical axis 0. The rod 33 passes through the window 29 and is connected at its end remote from the rods 21, 32 by an articulation 35 to a crank 26.

The spacing between the articulations of the rods 31, 32 on the pin 33 and the articulation 35 are identical to the spacing between the articulations 16, 17 and the articulation 26 for the device Q1.

The crank 36 is rigid with the crank 27 in such a way that the angle $\beta$ (FIG. 5) between the median lines of the crank 27 and the crank 36 remains constant.

Locking of the crank 36 with respect to the crank 27 may be obtained by means of a spindle 37 (FIG. 4) keyed on the end of the crank 27 and provided, at its end remote from the crank 27, with a portion having a square or rectangular cross-section designed to engage with an opening of corresponding shape provided in the crank 36.

The end of the pin 18 is located between the crank 36 and the crank 27. The articulation 26 of the end of the pin 18 is formed by a cylindrical zone of spindle 37.

The geometrical axes of the articulations 26 and 35 are located at the same radial spacing (see FIG. 5) from the geometrical axis 38 of the shaft 28 and therefore describe the same circular path 39 (see FIG. 5).

The spacing between the articulations 26 and 35 is selected such that the angular spacing $\alpha$ in the path 39, seen from the centre of the path, is substantially 90° between the two articulations 26 and 35.

This angular spacing $\alpha$ is provided in a direction such that the alternating rotary movement of the component 21 starts in a direction opposite to that of the component 34. For this purpose, the articulation 35 is disposed to the rear of the articulations 26 in the direction of rotation of the crank 27.

As shown in FIG. 5, the crank 27 is assumed to rotate in a clockwise direction as shown by the arrow F.

It is evident that, in the place of the crank 36 extending substantially along a chord of the path 39, the articulation 35 could be supported by a further radial arm rigid with the crank 27, but angularly offset with respect to the latter.

The component 34 comprises, in its central region, an opening 40 (FIG. 6) coaxial with the shaft 0 in which there is engaged a hollow cylindrical shaft 41 coaxial with the shaft 22 which may rotate freely within the hollow shaft 41. The rotational connection of the component 34 and the shaft 41 may be provided by the engagement of two diametrally opposite flat portions, provided on the outer surface of the shaft 41, with two rectilinear edges of the rectangular window provided in the component 34.

The shaft 41 is mounted in a cylindrical bearing 42 located between the component 34 and the end 43 of the shaft 41 remote from the component 34. The bearing 42 is itself mounted within a sleeve 44 comprising a collar 45 for fastening this sleeve to the plate 23.

The axial locking of the shaft 41 with respect to the sleeve 44 is obtained, on the side of the end 43, by means of a split ring 46 anchored in a throat provided on the periphery of the sleeve 41 and, on the other side, by a nut 47 screwed onto the threaded end of the shaft 41.

Friction washers 48, 49 are slightly tightened between the washer 46 and the sleeve 44 and between the component 34 and the sleeve 44 respectively. These washers 48, 49 are designed to reduce to a minimum the friction between the component 34, which moves with an alternating rotary movement, and the sleeve 44, which is fixed.

The end 43 of the hollow shaft 41 projects outwardly from the sleeve 44. This end 43 is rotationally rigid with a crank 50 shown in outline in FIG. 6 which supports the articulation pivot 11 disposed in parallel to the end 24 of the shaft 22. The spacing is shown by h. The rotational connection of the crank 50 and the shaft 41 may be provided by an appropriate means, in particular the engagement of two flat portions provided on the end of the shaft with two rectilinear edges of a rectilinear window in the crank 50.

The auxiliary windshield wiper arm 9 (not shown in FIGS. 4 to 6) is articulated on the pivot 11, as explained above with reference to FIG. 1.

As FIG. 4 shows, the device Q2 is located, with reference to the device Q1, on the same side as the end 24 of the shaft 22. In FIG. 4, the device Q2 is disposed above the device Q1.

The operation of the drive mechanism of FIGS. 4 to 6 is now explained with reference to FIGS. 7a to 11b.

The starting position corresponds to the fixed stop position of the windshield wiper blade, i.e. the position A of the blade 5 shown in FIG. 1. The two devices Q1 and Q2 are in the position shown in FIG. 5.

Figure 7A:
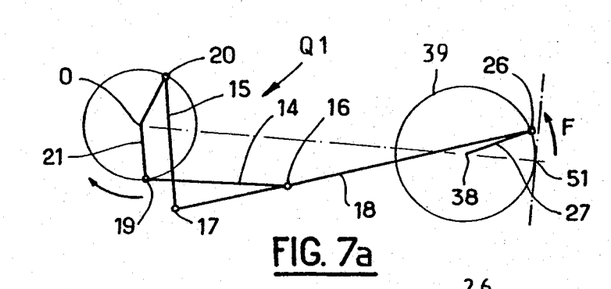
FIG. 7a is a diagram showing the positions of the various components of the four-bar linkage device for the movement of the main arm, at the beginning of the outward stage.
Figures 7B, 8B:
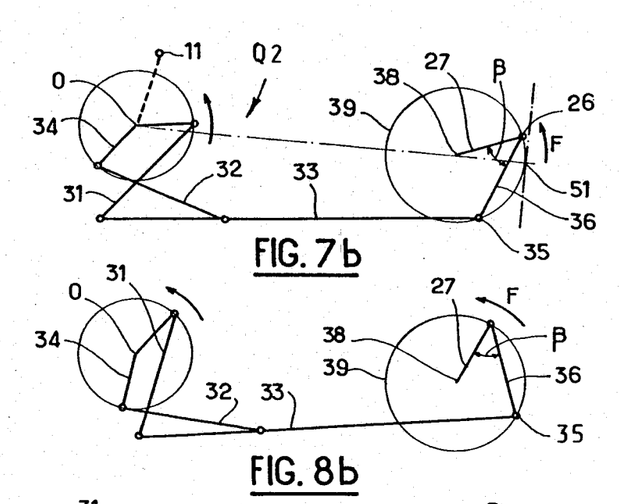
FIG. 7b is a diagram showing, in a similar way to FIG. 7a the positions of the various components of the four-bar linkage device for the movement of the articulation pivot of the auxiliary arm, also at the beginning of the outward stage.
FIGS. 8a and 8b show, similarly to FIGS. 7a and 7b, the respective positions of the components of the two four-bar linkage devices one quarter the way through the outward stage.

The respective arrangements of the devices Q1 and Q2 corresponding to FIG. 5 have been diagrammatically shown in FIGS. 7a and 7b. In order to simplify the diagrams of FIGS. 7a to 11b, the connecting rods 14, 15 and 31, 32 have been shown by rigid rectilinear segments, which showing has no effect from the kinematic point of view since the spacings between the various articulations are conserved.

In the starting position, the crank 27 has slightly passed, in the direction of rotation F, the point 51 having a tangent perpendicular to the straight line joining the centres 0 and 38.

It should be noted that FIG. 5 and FIGS. 7a to 11b correspond to a view from below of the devices Q1 and Q2 with respect to FIG. 4. In these circumstances, the directions of rotation shown in FIGS. 5 to 11b are the reverse of those which would be seen in a top view of the devices Q1 and Q2. In particular, a rotation of the component 21 in the clockwise direction in FIGS. 5 and 7 to 11a corresponds to a rotation of this component 21, and therefore the arm 4, in an anti-clockwise direction as shown in FIG. 1. In contrast, when the component 21 in FIGS. 7a to 11a rotates in an anti-clockwise direction in FIG. 1 the arm 4 rotates in a clockwise direction.

These comments also apply to the component 34 and the pivot 11.

At the beginning of movement, as shown in FIG. 7a, the pin 18 is pushed to the left of this Figure and the component 21 rotates in a clockwise direction as shown in FIG. 7a.

In contrast, as shown in FIG. 7b, the rod 33 is drawn to the right and the component 34 rotates in an anti-clockwise direction about the axis 0. Consequently, at the beginning of the movement, the pivot 11 rotates in a direction opposite to the arm 4, which corresponds to FIG. 3.

Figure 8A:
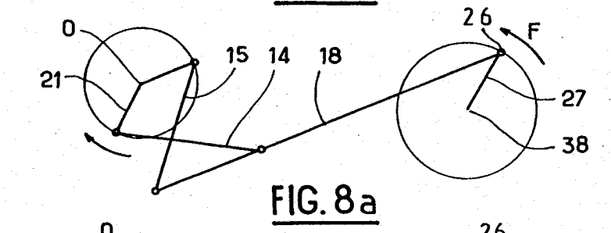

FIGS. 8a and 8b respectively show the components 21 and 34 which continue to rotate in the same direction, whereas the crank 27 has rotated through an angle of approximately 30° with respect to its initial position shown in FIGS. 7a and 7b.

The two movements of the components 21 and 34 continue in the same direction until the articulation 35 passes the point 51 of the path which corresponds to the invention of the movement of the component 34.

Figure 9A:
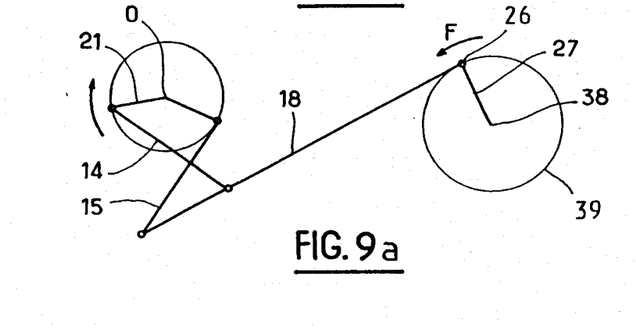
FIGS. 9a and 9b show similarly to FIGS. 7a and 7b, the respective positions halfway through the outward stage.
Figure 9B:
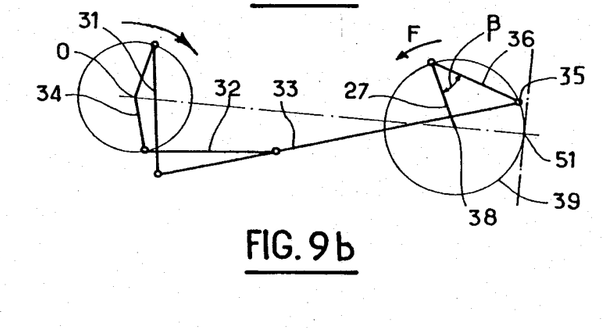

FIGS. 9a and 9b show the stage in which the crank 27 has rotated through slightly more than 90° with respect to its starting position in FIGS. 7a and 7b.

The component 21 then continues its movement of rotation about the axis 0 in a clockwise direction.

In contrast, as a result of the fact that the articulation 35 has passed the point 51, the movement of the component 34 is reversed and this component now rotates about the axis 0 in a clockwise direction, i.e. in the same direction as the component 21.

Consequently, after the pivot 11 has passed through the position $P_a$ of FIG. 1, corresponding to the passage of the articulation through the point 51, it now moves in the same direction as the arm 4 which has just passed through the position $D_m$.

This movement in the same direction of the components 21 and 34 continues until the articulation 26 reaches the point 52 on the path 39 (FIG. 10a) diametrally opposite to the point 51.

When the articulation 26 reaches the point 52, the arm 4 is in the other end position B (FIG. 1).

Figure 10A:
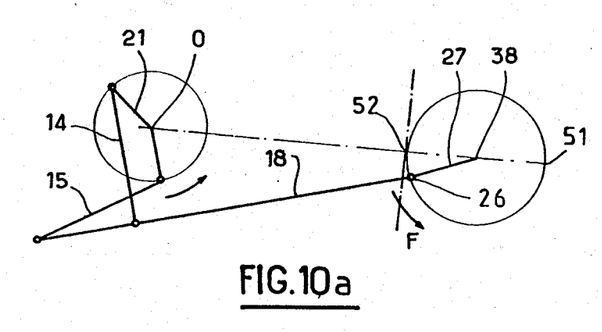
FIGS. 10a and 10b show in diagrammatic form the positions of the components at the beginning of the return stage.

When the articulation 26 passes the point 52, the rotary movement of the components 21 is reversed. As shown in FIG. 10a, the component 21 then begins to rotate about the axis 0 in an anti-clockwise direction.

Figure 10B:
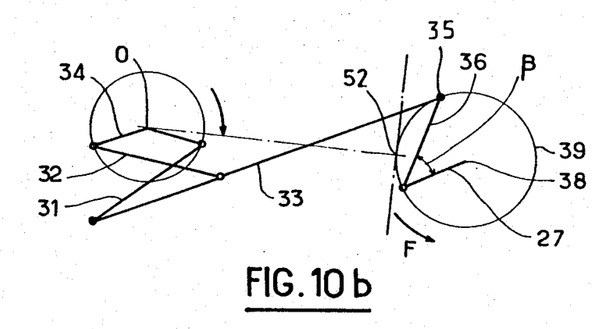

However, as shown in FIG. 10b, as the articulation 35 has not yet reached the point 52, the component 34 continues to rotate in a clockwise direction i.e. in the opposite direction to the component 21.

This is the beginning of the return stage of the movement of the windshield wiper blade 5 in the region lying between the position B and the median position $D_m$.

Finally, when the articulation 35 reaches the point 52 the pivot 11 is located in the position $P_b$, whereas the arm 4 is in the position $D_m$.

Figure 11A:
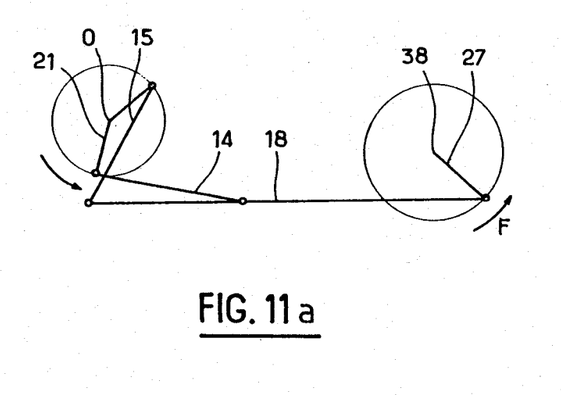
FIGS. 11a and 11b show in diagrammatic form the positions of the components halfway through the return stage.
Figure 11B:
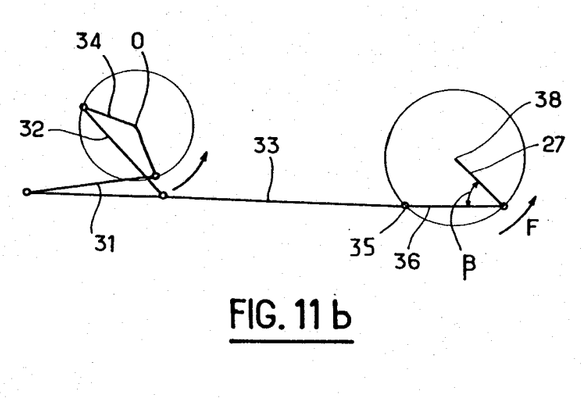

The rotary movement of the component 34, when the articulation 35 has passed the point 52, is reversed and continues again in the anti-clockwise direction, as shown in FIG. 11b.

The component 21, as shown in FIG. 11a, continues to rotate in the anti-clockwise direction (i.e. in the same direction as the component 34) for this latter part of the return stage of the movement of the blade 5.

It can be seen that the drive mechanism comprising the two four-bar linkage devices Q1, Q2 enables the achievement of the kinematic connection described above, leading to a curved figure 8 path for the windshield wiper blade 5.

Various modifications may be made within the scope of the invention as defined in the appended claims.

I claim:

1. In a windshield wiper device with a non-circular sweeping motion, for vehicles, comprising a blade which has a composite motion comprising an alternating oscillation about an axis of rotation combined with a movement of translation, such that the windshield wiper blade describes a first path during an outward movement stage of the oscillation from a first angular end position to a second angular end position, and a second path, which differs from the first path, during a return movement stage thereof from the second end position to the first end position, the improvement comprising, a drive mechanism for causing the longitudinal ends of the windshield wiper blade and the windshield wiper blade between said ends to describe paths having the shape of a curved and flattened figure 8 whose concave area faces the axis of rotation, with the point of intersection of the lobes of the flattened 8 being disposed substantially in the axis of the vehicle, and the ends of the lobes being substantially tangential to the angular end positions of the windshield wiper blade, and wherein said drive mechanism comprises, a main windshield wiper arm which carries, at a location remote from the axis of rotation, a rocker arm articulated on the main arm for movement about a first transverse axis which is substantially parallel to the surface to be cleaned, said windshield wiper blade being articulated to said rocker arm for movement about a second transverse axis substantially parallel to said first transverse axis, an auxiliary arm articulated on the rocker arm, generally between said two transverse axes, said auxiliary arm controlling the rocker arm movements to cause a displacement of the windshield wiper blade in a direction substantially parallel to its longitudinal direction, in which the movements of the main arm and the auxiliary arm are angularly offset such that, in the two angular end positions of the main arm and in the median position of this arm, the two articulations of the auxiliary arm and the main arm occupy a relative median position in the longitudinal direction of the main arm, whereas these two articulations move, during the outward stage, through a relative end position for a position of the main arm disposed between the first angular end position of the main arm and its substantially median position, and during the return stage from said second end position, the articulations pass through the relative end position for a position of the main arm disposed between the second angular end position of the main arm and its substantially median position.

2. A device as claimed in claim 1, in which the auxiliary arm is articulated on a pivot which is radially offset with respect to the axis of rotation of the main arm, this pivot itself being caused to rotate alternately about the axis of rotation of the main arm, the alternating rotary movement of the pivot being angularly phase shifted with respect to the alternating rotary movement of the main arm.

3. A device as claimed in claim 2, in which the two alternating rotary movements of the main arm and the articulation pivot of the auxiliary arm preferably have the same amplitude and are angularly offset by an angle which is substantially equivalent to half of the angular amplitude of the alternating movements, the two movements also starting in the opposite direction from an angular end position of the main arm.

4. A device as claimed in claim 2, in which the drive mechanism comprises two devices of the cross-shaped four-bar linkage type, one of these devices imparting the alternating rotary movement to the main arm, the other device imparting the alternating rotary movement to the articulation pivot of the auxiliary arm.

5. A device as claimed in claim 4, wherein the four-bar linkage of each device of the drive mechanism comprises two connecting rods which intersect in an articulated manner at one of their ends on a pin and at their other ends on a component, forming a lever and rotating about a fixed geometrical axis, and in which one of the components is rotationally rigid with the axis of rotation of the main arm coaxially with the geometrical axis of rotation of the component, and in which the articulation pivot of the auxiliary arm is rigid with the other component forming a lever, but is offset radially with respect to the geometrical axis of rotation of this component.

6. A device as claimed in claim 5, in which the angular displacement on the circular path between the articulation of the first pin and that of the second pin is approximately 90°.

7. A device as claimed in claim 5, in which the articulation of the second pin is disposed to the rear of the articulation of the first pin in the direction of rotation of the crank.

8. A device as claimed in claim 5, in which the pin of one of the devices of the cross-shaped four-bar linkage type is articulated at its end remote from this linkage on the end of a crank caused to rotate, as its other end, by a drive shaft, the pin of the other four-bar linkage device being connected to an articulation caused to follow a circulation path about the same axis of rotation as the crank but offset angularly with respect to this crank.

9. A device as claimed in claim 8, in which the articulation of the second rod describes a circular path having the same radius as the articulation of the first pin, and in which the axis of articulation of the second rod is provided on a further crank which is rigid with the said crank.

10. In a windshield wiper device with a non-circular sweeping motion, for vehicles, comprising a blade which has a composite motion comprising an alternating oscillation about an axis of rotation combined with a movement of translation, such that the windshield wiper blade describes a first path during an outward movement stage of the oscillation from a first angular end position to a second angular end position, and a second path, which differs from the first path, during a return movement stage thereof from the second end position to the first end position, the improvement comprising, a drive mechanism for causing the longitudinal ends of the windshield wiper blade and the windshield wiper blade between said ends to describe paths having the shape of a single curved and flattened figure 8 whose concave area faces the axis of rotation, with the point of intersection of the lobes of the flattened 8 being disposed substantially in the axis of the vehicle, and the ends of the lobes being substantially tangential to the angular end positions of the windshield wiper blade, and wherein said drive mechanism comprises, first drive means connected to said wiper blade for oscillating said wiper blade between said first and second angular end positions, and second drive means for moving said wiper blade toward and away from said axis during oscillating of the blade between said first and second end positions, said second drive means comprising means for moving said blade to a position the same distance from the axis at each of said end positions of the blade and at the point of intersections of the lobes of the flattened figure 8, and for moving the blade away from and toward said axis to trace the path of said single curved and flattened figure 8 during each oscillation of the blade from said first end position to said second end position and back to said first position.

* * * * *